United States Patent [19]
Yaker

[11] Patent Number: 5,950,167
[45] Date of Patent: Sep. 7, 1999

[54] SCREEN-LESS REMOTE VOICE OR TONE-CONTROLLED COMPUTER PROGRAM OPERATIONS VIA TELEPHONE SET

[75] Inventor: Rhoda Yaker, Hunterdon County, N.J.

[73] Assignee: Lucent Technologies Inc., Murray Hill, N.J.

[21] Appl. No.: 09/013,665

[22] Filed: Jan. 26, 1998

[51] Int. Cl.[6] .................................................. G10L 9/06
[52] U.S. Cl. ........................................ 704/275; 704/270
[58] Field of Search .................................. 704/235, 270, 704/275

[56] References Cited

U.S. PATENT DOCUMENTS

| 5,752,232 | 5/1998 | Basore et al. | 704/275 |
| 5,799,273 | 8/1998 | Mitchell et al. | 704/235 |

OTHER PUBLICATIONS

Chris Schmandt, Mark S. Ackerman, and Debby Hindus, "Augmenting a Window System with Speech Input", IEEE Computer, vol. 23, No. 8, pp. 50–56 Aug. 1990.

Nicholas C. Lee and David Keating, "Controllers for Use by Disabled People", Computing & Control Engineering Journal, pp. 121–124. Jun. 1994.

Stephan Gamm, Reinhold Haeb–Umbach, and Detlev Langmann, "Findings with the Design of a Command–Based Speech Interface for a Voice Mail System," Proc. Third IEEE Workshop on Interactive Voice Technology for Telecommunications Applications, pp. 93–96. May 1996.

Brochure, kunzweil Voice Plus 2.5 (undated): Allows local voice operation of a personal computer spreadsheet, database, wp and E mail applications.

CNN website article "Computer, Take a Letter" Jan. 6, 1997: User invokes remote PC E–mail program by dial–up from Telephone Terminal, using voice commands.

Brochure, Dragon Systems product "Dragon Naturally Speaking" Oct. 1997: Locally invokes word processor of a PC by voice command and creates general text.

Lucent Technologies, Inc. product Intuity™ conversant® 1997 and earlier: recognizes caller speech from remote Telephone; responds with sequence of voice prompts differing with the application.

*Primary Examiner*—Richemond Dorvil
*Assistant Examiner*—Tālivaldis Ivars Šmits
*Attorney, Agent, or Firm*—Charles E. Graves

[57] ABSTRACT

Computer programs such as word processing, spreadsheet and electronic mail are run from a remote telecommunications terminal, without benefit of any user interaction with a screen display, by software associated with the computer that translates a combination of remotely-generated tone and voice signals to executable application program commands. The communication protocols use a conversant system's query-response sequences to call up an application and to run selected portions of the program. Pre-recorded voiceprints of a particular user's voice commands and utterances required to operate the software are stored at the computer; and compared during usage to the actual utterances. Insufficient matches result in suspension or termination of access.

22 Claims, 7 Drawing Sheets

| APPLICATION | FUNCTION | YES | NO |
|---|---|---|---|
| | | | |
| WORD PROCESSOR | CREATE NEW FILE | X | |
| WORD PROCESSOR | MODIFY EXISTING FILE | X | |
| WORD PROCESSOR | DELETE EXISTING FILE | | X |
| WORD PROCESSOR | EMAIL FILE | | X |
| | | | |
| | | | |
| SPREADSHEET | CREATE NEW FILE | X | |
| SPREADSHEET | MODIFY EXISTING FILE | X | |
| SPREADSHEET | DELETE EXISTING FILE | X | |
| SPREADSHEET | EMAIL FILE | X | |
| ELECTRONIC MAIL | READ NEW MESSAGES | X | |
| ELECTRONIC MAIL | READ OLD MESSAGES | X | |
| ELECTRONIC MAIL | COMPOSE MESSAGES | X | |
| ELECTRONIC MAIL | DELETE MESSAGES | | X |
| | | | |

SCREEN-LESS REMOTE VOICE OR TONE-CONTROLLED COMPUTER PROGRAM OPERATIONS VIA TELEPHONE SET

TECHNICAL FIELD

This invention relates to communications with computers from locations remote from the computer's situs; and more particularly, to running of a personal computer's application programs by remotely-generated voice or tone commands from a telephone set when a screen display of interactive menus and command icons is not available to the user.

BACKGROUND OF THE INVENTION

One advantage of portability offered by laptop-size personal computers is that the programs and files of another computer at a remote location can be accessed and used through dial-up over a public network. This advantage is offset by the work involved in carrying and safeguarding the instrument during travel. Additionally, traveling users needing to communicate with a remote computer still experience problems in locating suitable telephone jacks for connection of their portable computer to a public network.

On the other hand, telephone terminals are widely available and presently provide a way for a user to access at least some of the functionalities of a remotely-located computer. Remotely accessing a personal computer's application program capability, including specifically word processing, spreadsheet and email is dependent, however, on the user being able to enter quickly and easily all necessary commands to open and use the programs without benefit of a monitor display of command icons and menus; and to forward the results to any selected destination.

Current conversant system products provide voice and word recognition/response capabilities. These include the capability to converse in voice mode with a caller, to recognize a caller's spoken response to voice prompts, and to react to the response by taking various actions such as to record a voice mail message. The systems also include the capability to convert voice to text and text to voice; and to compare voiceprints. One such conversant system, available from Lucent Technologies Inc., is the INTUITY™ CONVERSANT® product. Examples of applications which this product supports include: order entry; pay-for-service; automating of common business functions such as auto attendant, bulletin board and form filler; automated information collection; graphical speech editing which enables the cutting and pasting of speech files; automated voice-directed incoming call routing; voice-activated call answering; voice mail; and more. These applications are contained in software which can be added to existing communications systems such as a PBX through an add-on "voice card", and in other ways. However, the commands in the current conversant system applications are usually very application-specific; and thus they typically limit the remote user's voice entry choices to functions contained in the application.

Many current conversant systems applications use text-to-voice and voice-to-text conversions. Some applications give flexibility to a remote user to select options without having to hear or go through an entire menu of choices. However, the functions that, for example, a conventional word processor provides, such as text editing, text formatting and user-defined routing, are not available on existing conversant system applications to provide user-friendly remote operation form a telephone terminal. The open-ended, user-controlled command structure needed to remotely operate a word processor or a spreadsheet on a personal computer and to forward files to a destination with remote command, has been lacking in the conversant systems art.

Products are also available which enable a user to locally invoke the edit function of a word processor in a personal computer. The user turns on the personal computer, issues a voiced command to the computer's microphone to "OPEN WORD PROCESSOR", and through further specified voiced commands dictates text and saves the dictation as a text file. An example of a personal computer software product which recognizes and creates general text from normal speech is Dragon Naturally Speaking®, available from Dragon Systems at website www.dragonsys.com. The Kurzweil VoicePLUS 2.5 as described in their product brochure is a similar product which also allows voice operation of spreadsheet, database and email applications. The voice commands of these products are issued locally at the personal computer.

Other systems have existed for some years which allow users to call up their computer and voice-prompt it to read E-mail. A recent such product was described in an article "Computer, Take a Letter" on the CNN website (www.cnnfn.com/digitaljam/9701/06). Remote use of the application programs of a personal computer for a telephone terminal, however, requires among other things a convenient command structure which allows user flexibility in the entering and sequencing of the commands. Remote use from a telephone terminal also requires security protocols and routines to, for example, forward files by remote command, which are specific to such remote access and usage. Such security protocols and routines to date have remained largely undeveloped.

SUMMARY OF THE INVENTION

Operation of computer programs such as word processing, spreadsheet and electronic mail that normally require user interaction with a computer screen display of functionalities and commands, is made possible in accordance with the invention with a combination of remotely-generated tone signals and voice commands which require no user interaction with a screen. The user employs a standard telephone terminal to issue keyed and voiced commands to run from a remote location essential functionalities of the programs.

In an illustrative embodiment, a conversant-type voice recognition and command system associated with the personal computer receives, over a standard dial-up telephone line, instructions from the remotely located user which are issued in both tone and voice form. The voice is that of the user. The tones are generated by the user with the telephone instrument's alphanumeric key pad.

The conversant system is programmed to include voice prompts and word recognition capability specifically to run the principle operations of a word processor, a spreadsheet and an email program. The conversant system responds to a call from the remote user with a series of voiced prompts and questions, to which the remote user responds by punching designated keypad buttons and with voiced instructions. The first tones or voiced commands select one of the specific available application programs on the computer. In response to the selection of an application, i. e., a word processor, the conversant system transmits to the user further logically sequenced voice prompts. The user responds to each by issuing voice commands or by punching a designated keypad button, to quickly configure the computer to perform a function, such as creating a new letter file. When configured, the command system advises the remote user by voiced message to begin voice dictation. As dictation proceeds, the voice-recognition capability of the conversant system translates the user's dictated text to a text file. The user can order the text file to be read back for correction. Thereafter, the user can direct the text file by tone or voice commands to an ultimate destination such as a printer, a fax machine or an email address. Further, at any time during a remote usage session, the user can interrupt an on-going application program routine structured in accordance with sequenced prompts from the conversant system, and issue voice commands that are out of the logical prompt sequence.

Security codes known to the user and entered in an access-restricting table in the computer, enable access to and use of the computer's files and program functionalities only to the extent specified in advance by the user. Additional computer access security is afforded by running voice recognition routines concurrently with the remote user's session. The conversant system includes separate logically sequenced voice prompts and word recognition features to operate a spreadsheet and email.

BRIEF DESCRIPTION OF THE DRAWING

FIG. 6 is a table illustrating protocols limiting access for application programs to only specified functionalities.

DETAILED DESCRIPTION

Figure 1:
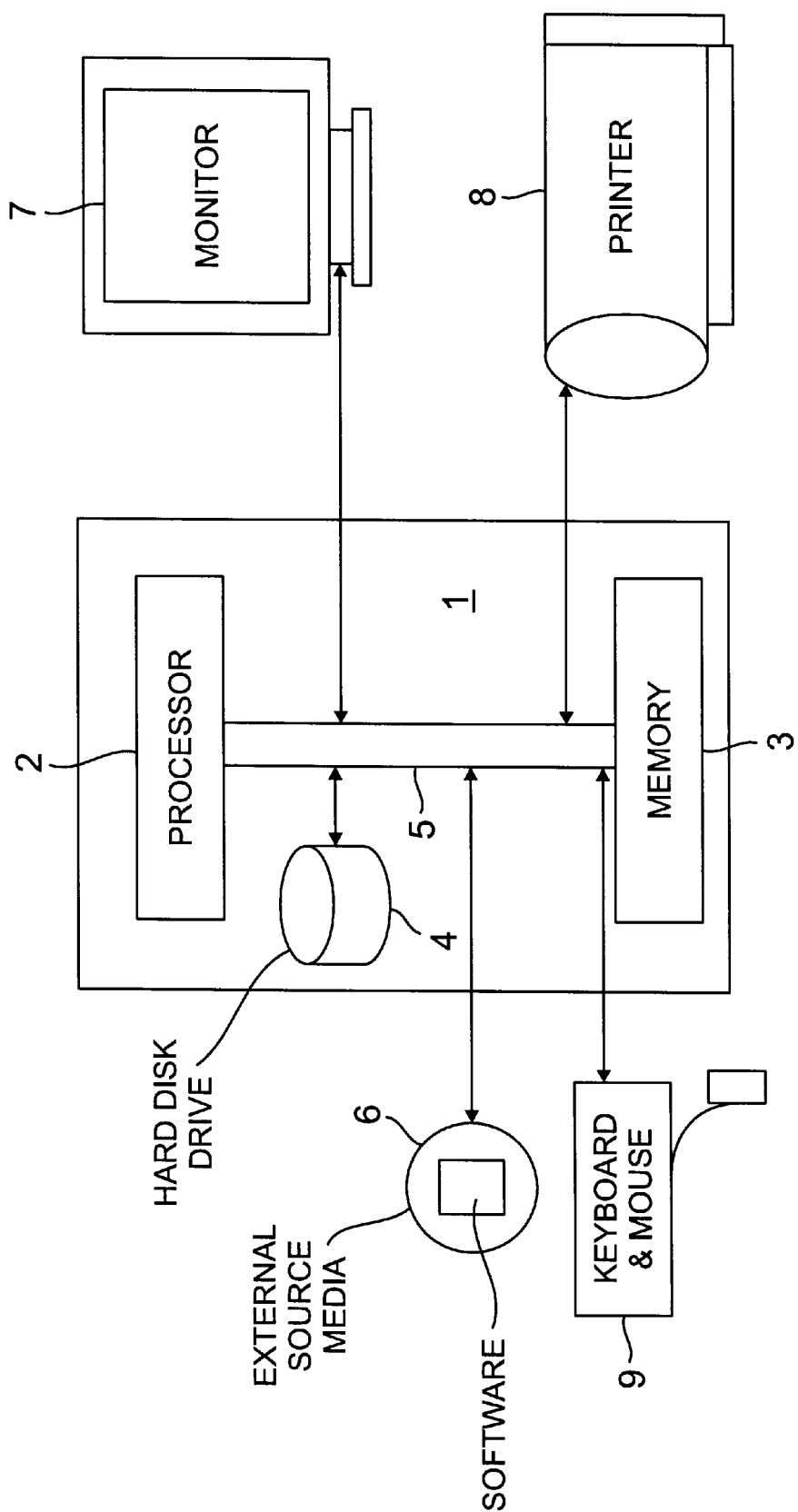
FIG. 1 shows the components of a typical desktop computer set-up for home or office use.

FIG. 1 shows an arrangement of apparatus exemplifying a typical desktop computer set-up for home or office use. The computer set-up will usually be referred to hereinafter as a data processing system ("DPS") denoted 1. DPS 1 includes a processor 2, a memory 3 and secondary storage 4 which is a machine-readable medium such as a hard disk drive. These components are interconnected by internal bus 5. Memory 3 may include volatile memories (DRAM, SRAM); and non-volatile memories (ROM, FLASH, EPROM and EEPROM). An external store 6 consists of machine-readable media such as floppy discs, removable hard drives, magnetic tape, CD-ROM, or other computers. The arrangement also includes a monitor 7, a printer 8 and mouse/keyboard 9, all connected to bus 5.

External store 6 exemplifies media on which software for practicing the invention may be incorporated. Persons skilled in the art will recognize that a wide range of choices exist for locating the totality of software in a given desktop computer installation. The operating system software, word processors, spreadsheets, electronic mail and other user software, including software for executing the invention herein, can be stored in memory 3, secondary storage 4 and/or external store 6. Executable versions of computer software can be read from non-volatile memory in memory 3, external storage 6 and/or secondary storage 4. The executable software may loaded for execution directly into volatile memory; or may be executed directly out of non-volatile memory; or alternatively, stored in secondary storage 4 prior to loading into volatile memory for execution.

Figure 2:
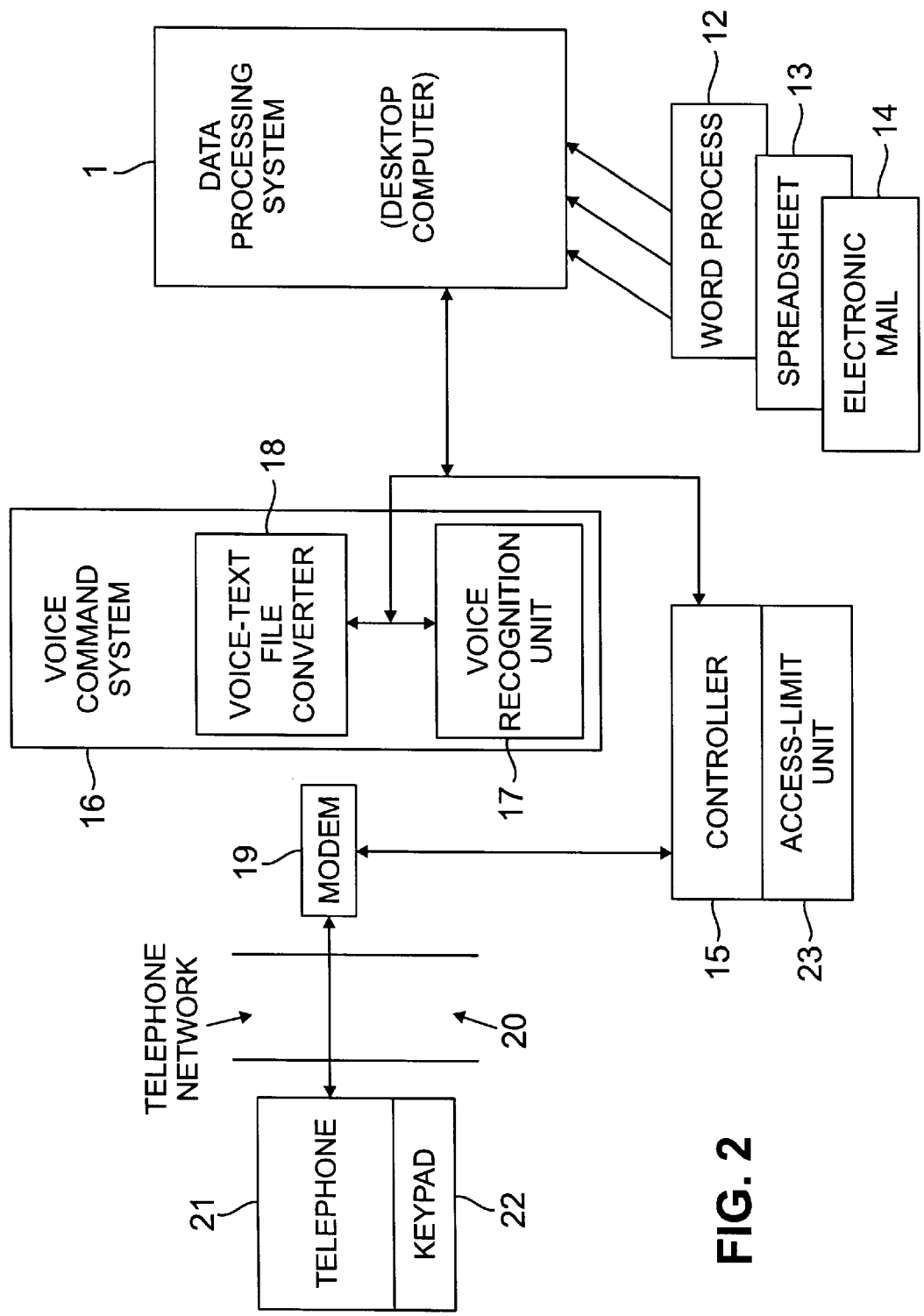
FIG. 2 is a schematic block diagram illustrating structural changes to FIG. 1 for practicing the invention.

Application programs of DPS 1 are normally run at the system's home or office location in the usual manner, by the user clicking on application-specific icons or on the file name shown on the screen of monitor 7. Referring now to FIG. 2, to enable DPS 1 to be operated from a remote location, a controller 15 and voice command system ("VCS") 16 are added to the arrangement of FIG. 1. Controller 15 translates remotely-generated tone signals to specific keyboard commands that load and run the application programs in a manner to be described. VCS 16 includes an incoming voice-recognition unit ("VRU") 17 and a converter 18 that provides voice-to-text file and text file-to-voice conversion capability. A communications device such as a modem 19 connects DPS 1 to a telephone network 20. A telephone terminal 21 with an alphanumeric keypad 22 is connected to network 20, which may be a public-switched network, allowing a user to dial-up DPS 1. An access limit unit ("ALU") 23 associated with controller 15 and cooperating with VCS 16 provides a dual security check as described hereinafter.

FIG. 2 shows controller 15 and voice command system 16–18 as physically separate entities from DPS 1; but it is understood that their functionalities may be implemented partially or wholly in software resident in external store 6, in secondary storage 4 or in hard drive 11.

Software which when suitably programmed performs the function of VCS 16, VRU 17 and converter 18 is commercially available from Lucent Technologies Inc. in the product INTUITY™ CONVERSANT® current version 6.0. The basic speech feature provides voice prompts and various voice responses to callers. The FlexWord speech recognition feature enables recognition using a user-defined vocabulary of up to 2000 words in up to five languages. Product features, applications and supporting information are obtainable at the Lucent Technologies Inc. WebSite at www.Lucent.com. The documentation available at this WebSite relating to INTUITY™ CONVERSANT® products is hereby incorporated by reference.

One computer suitable for use with the invention is a Macintosh® Powerbook® 4400 equipped with a 137 MHz. processor, 16 MB RAM, 1.3 GB hard drive and an internal 28.8 Kbps modem. Use of the invention is not limited to specific types or brands of computers or voice recognition systems.

The tone and voice signals to be described which controller 15 converts to the specific keyboard or mouse commands are sufficient to run application programs such as word processor 12, spreadsheet 13 and electronic mail 14, with sufficient functionalities to allow basic operations without necessarily providing control over all program calls. The examples below demonstrate the invention as applied to the above-noted applications. These are merely illustrative since the invention is not application program-specific.

Figure 3:
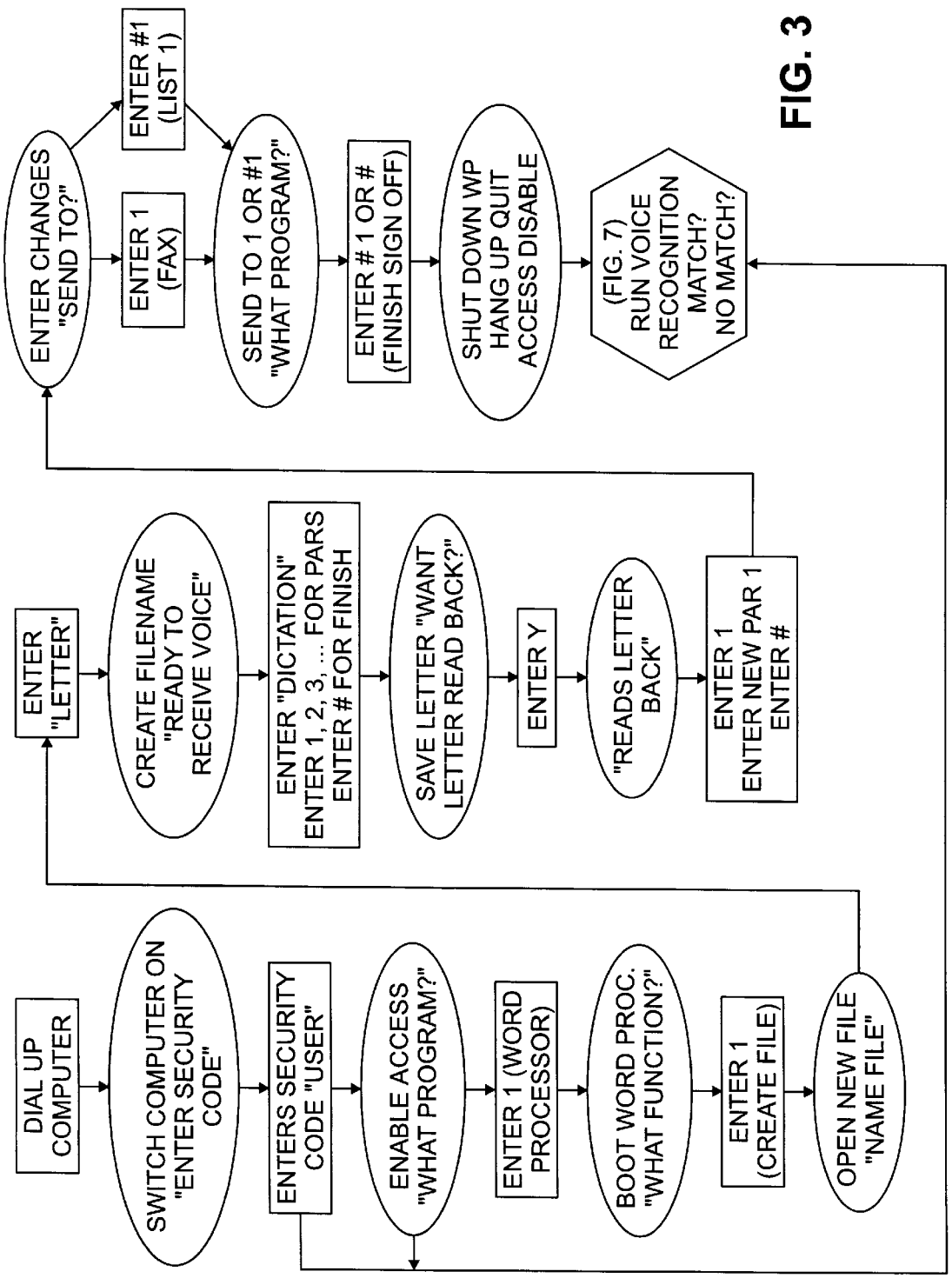
FIG. 3 is a flow chart illustrating use of both voice and tone commands to remotely operate a word processing program.

FIG. 3 describes a sequence of steps by which a user composes and sends a letter by controlling DPS 1 with a combination of tone signals and voice instructions issued from telephone terminal 21 to operate word processor 12. The user first dials the telephone number to which DPS 1 is connected through modem 19. Controller 15 recognizes the call as a service request and turns DPS 1 "on" if it is not already on. In the voice mode VCS 16 asks the user for a security code. The user keys in a unique enabling code. In addition if desired, the user speaks a security code word such as her name for voice recognition by VRU 17. When ALU 23 and VRU 17 allow access, controller 15 configures DPS 1 to receive commands and data.

VCS 16 asks: "WHAT APPLICATION PROGRAM DO YOU WISH"? In response, the user enters a tone code from keypad 22, e.g., the numeral 1, which controller 15 recognizes as the command to open the word processor application. In addition to or instead of keying in the application program instruction, the user voices "OPEN WORD PROCESSOR". The numeral 2 may designate the spreadsheet application, numeral 3 the electronic mail application, and so on. An alternative prompt from VCS 16 is: "ENTER 1 FOR WORD PROCESSOR; ENTER 2 FOR SPREADSHEET; ENTER 3 FOR EMAIL".

Responding, controller 15 opens the word processor. VCS 16 asks: "WHAT FUNCTION DO YOU WISH?" The user keys in the numeral 1 to create a file. (Alternatively, numeral 2 may open an existing word file, and so on). Responding, controller 15 opens a new file to receive the letter and prompts: "NAME THE FILE". User speaks the file name. Converter 18 converts the spoken file name to a text file, and enters the file name. VCS 16 reports: "READY TO RECEIVE DICTATION". User proceeds to dictate the letter. Converter 18 receives and converts the dictation to a text file which is entered under the named file in word processor 12. When finished with dictation, user keys in a tone signal such as "#", which saves the file. Alternatively, user voices the word "SAVE" which VRU 17 recognizes as the SAVE command.

Following file save, VCS 16 asks: "DO YOU WANT THE FILE READ BACK?" User presses "Y" or says "YES", to signify affirmatively. In response, VCS 16 switches to its text-to-voice mode and reads back the letter.

Corrections to the newly-dictated letter may be made by the user keying in at the beginning of each sentence or paragraph an identifying mark such as, for example, "1", "2", etc., during dictation. If during or after read-back user then wishes to correct or modify a sentence or paragraph, user keys in a keypad signal such as "*1" and re-dictates the sentence or paragraph associated with the keyed-in signal. This signal, e.g., "*1", is recognized by controller 15 as a command to delete all text of the passage denoted "1", and to substitute the new text. When corrections are completed, the user again keys in the tone signal "#" which saves the revised file. Alternatively, the user vocalizes the word "SAVE".

Following corrections, if any, VCS 16 asks: "DO YOU WANT TO SEND THE LETTER?" In response, user keys in the numeral corresponding to a selected destination wherein the destination set is, for example: 1-fax; 2-email; 3-copier, 4-printer, etc. Responding, VCS 16 asks for the destination telephone numbers or addresses as appropriate. If the address can be fully designated by a simple number such as "1" for the designated printer 8, user simply keys in the number followed by a tone such as "#" to send. If the destination requires entering a multi-digit fax or email address, user enters the appropriate phone number via keypad 22 or voice. When addressing is completed, user presses a tone such as "#" to so indicate. Alternatively, the user voices the word "FINISH" (or "END").

It is useful for the user at any time during a remote usage session, to be able to interrupt an on-going application program routine structured in accordance with sequenced prompts from the conversant system, and issue voice commands that are out of the logical prompt sequence. The remote command capability of the present invention is open-ended in the sense that a user can issue whichever command is needed in the circumstances, without waiting for a particular action to be completed, or having to run through the next series of prompts in the order in which they are programmed. Thus, for example, while engaged in dictating a new letter, the user may at any time decide to open another file and have it read back. The user voices a command "OPEN FILE X"; and in response, VCS 16 suspends the dictation session, opens file X, and announces: "FILE X OPEN". User then voices the command "READ FILE X"; and in response, VCS 16 reads the file in voice mode. When finished listening, whether file X is fully read or not, user says "CLOSE FILE X" followed by "RESUME LETTER"; and in response VCS 16 executes these commands.

The ability of a user to direct application program files on a personal computer to an ultimate destination such as a printer, a fax machine or an email address simply by remotely-issued tone or voice commands, greatly enhances the utility of personal computers. In accordance with the invention, a user can set up address lists in DPS 1 for mass delivery of a document to a customized set of addressees. These lists may be ordered up remotely by the user to specify a particular addressee set for any of the above destinations. For example, if it is desired to send the new letter to the user's customized address list #1, then in response to VCS 16 asking for the destination telephone numbers or addresses, user enters a code such as $1 which instructs DPS 1 to consult custom address list 1 for destination information. Alternatively, user can voice the command "DOLLAR ONE" which VRU 17 recognizes as the equivalent of the corresponding key command. Responding to address commands, DPS 1 sends the letter. When delivery to the destination is completed, VCS 16 reports to user: "MISSION ACCOMPLISHED". If the user now wishes to sign off, she keys in a sign-off code, for example, "@". Alternatively the user voices the word "SIGN-OFF".

Figure 4:
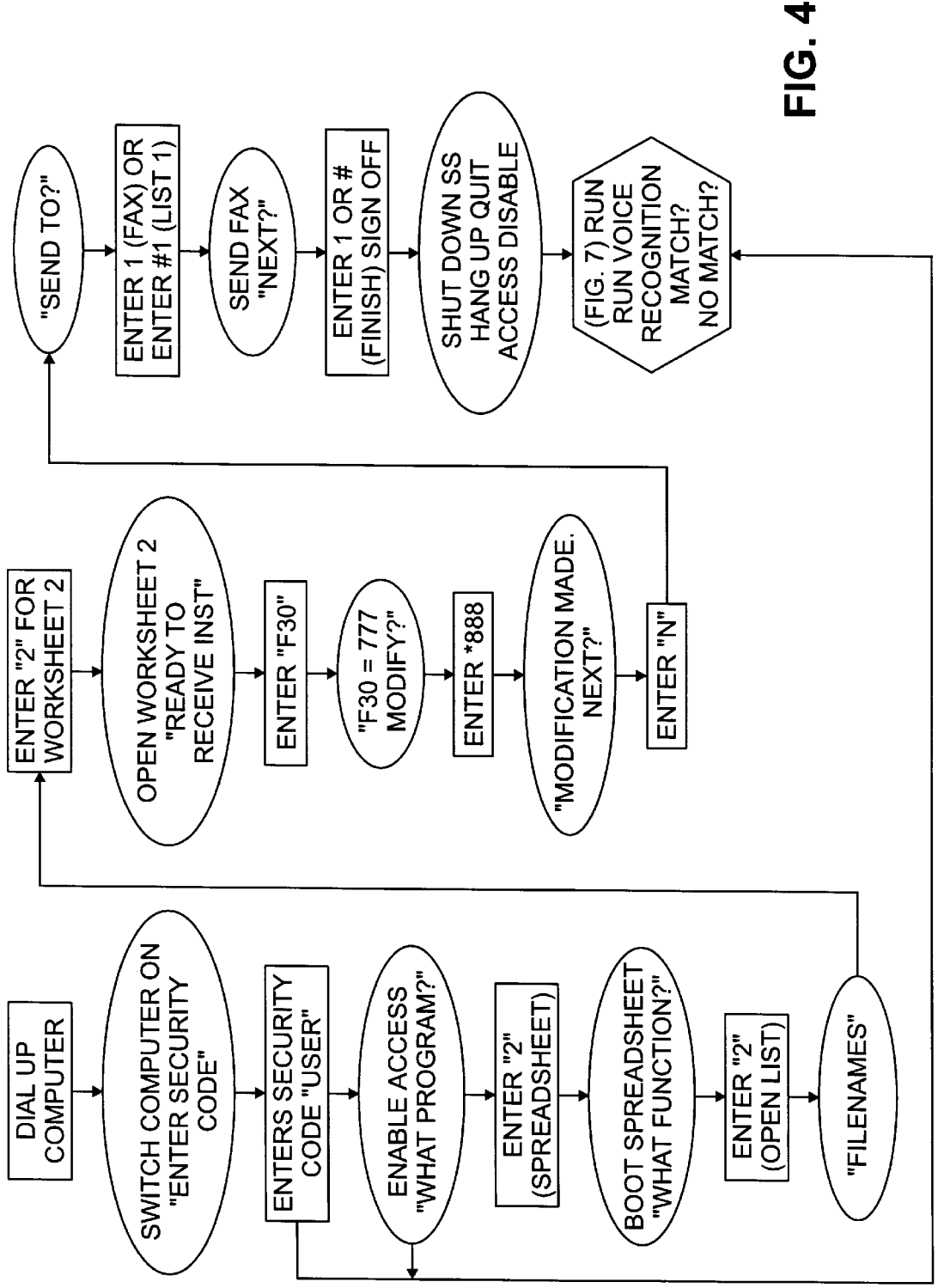
FIG. 4 is flow chart illustrating remote operation of a spreadsheet program.

In similar fashion, spreadsheet applications may be remotely run by following voice and keyed signal protocols. The following is an example of how an existing spreadsheet may be modified. Referring to FIG. 4, user dials up DPS 1 and executes the security check. After access is granted and in response to the voice prompt "WHAT PROGRAM"?, the user enters "2" or voices "TWO" to invoke the spreadsheet. With the spreadsheet booted, the voice query asks: "WHAT FUNCTION?", and user enters "2" to open an existing worksheet. (Alternatively, the command "1" or "ONE" may command opening of a new spreadsheet). In response, VCS 16 summons the list of existing workbooks and voice-prompts: "ENTER 1 FOR WORKBOOK (TITLE 1); ENTER 2 FOR WORKBOOK (TITLE 2) . . . " etc. User recognizes the desired title and keys in, for example, "2". In response, VCS 16 brings up title 2 and prompts: "READY TO RECEIVE INSTRUCTION". With a hard copy of the existing workbook preferably at hand, user then enters modifications. For example, user may wish to modify the content of cell F30. User keys in "F30" or says "F THIRTY" to point to cell F30. VCS 16 replies in voice: "F30 CONTAINS 777; WHAT MODIFICATION?" In response, user keys in "*888" or voices "STAR 888", wherein the asterisk signifies the command "substitute" and the number "888" is the number to be substituted. Voicing of the number "888 . . . " may be advantageous when the number is many digits in length. In response VCS 16 makes the substitution and reports "MODIFICATION MADE; NEXT?" If next user wishes to, for example, add a label to a cell she voices the command: "F30 LABEL GROCERIES". By following the hard copy in hand, user may add further numbers, labels or functionalities to cells of the workbook. When completed, user may save and then file or distribute the workbook as in the word processor example.

Voice commands to add further specificity or functionality to any particular spreadsheet address, e. g., cell F30, may be included in the recognition capabilities of VRU 17. For example, the voice command "DECIMAL" may be programmed to mean "place a decimal point here"; the voice command "OPAREN" to mean "add an open parenthesis here"; the voice command "CLOPAREN" to mean "add a close parenthesis here"; the voice command "POW (NUMBER)" to mean "raise the preceding number to the following power"; the voice command "SLASH" or "DIVIDED BY" to mean "divide the preceding number by the following number"; the voice command "TIMES" or "MULTIPLY" to mean "multiply the preceding number by the following number"; the voice command "PLUS" to mean "add the preceding number to the following number"; the voice command "MINUS" to mean "subtract the following number from the preceding number"; the voice command "EQUALS" to mean "the current cell performs the following function"; and etc.

Figure 5:
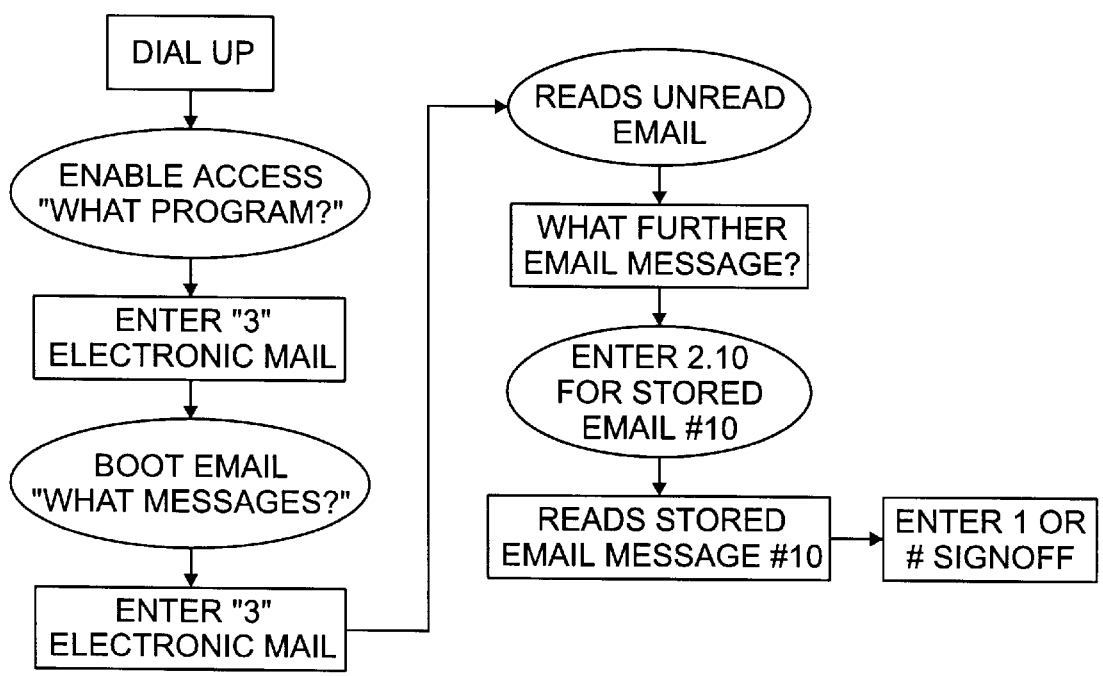
FIG. 5 is a flowchart illustrating remote operation of an email application.

Email programs may also be operated remotely in accordance with the invention as illustrated in FIG. 5. The contents of a received email file in DPS 1 may be read during the same call in which other applications are used; and is an alternative to dialing up the email provider. As with the word processor and spreadsheet applications, user dials up DPS 1, gains secure access and receives the initial command request "WHAT PROGRAM?" User keys in "3" or voices "THREE", instructing controller 15 to bring up the email application. The program boots up and user receives the prompt: "WHAT MESSAGES?" User enters "1" or voices "ONE", instructing controller 15 to read out unread email. In response, controller 15 downloads any unread email text files to VCS 16; and converter 17 reads out in voice the unread email messages. On finishing, converter 18 issues the voice prompt: "WHAT FURTHER EMAIL MESSAGES?" At this point, if user desires to hear a stored previously read email message, user keys in a command "2.10" wherein the number "2" signifies stored email messages file and the number "10" signifies stored message number 10. Alternatively, user voices the command "TWO DECIMAL TEN". In response, controller 15 accesses the stored message number 10 and instructs converter 18 to read out the message. Thereafter, in response to the prompt "WHAT NEXT?", if user is finished with the session user keys in or voices "ONE", signifying sign-off.

Security in any computer remote access system is critical. Therefore, it may be desirable to set up a file on DPS 1 which restricts remote access. For example, controller 15 in combination with ALU 23 may be programmed to permit remote access only to the word processor and to no other folder or application. Further, controller 15 may be set to permit creation of text files and permit access to existing text files to permit remote retrieval and to send email documents from the remote location, but not to edit email documents. The table in FIG. 6 illustrates one set of possible restrictions of the type illustrated. Access restrictions such as are illustrated in FIG. 6 are conventionally implemented in software resident in, e.g., memory 3.

Use in accordance with the invention of a combination of remotely-generated tone signals and voice commands to invoke essential functionalities of conventional application programs, also offers a unique further way for preventing access to DPS 1 by unauthorized persons or machines. Additionally, voiced commands can be utilized to permit a user to override from the remote location access restrictions if other security conditions are met.

Specifically, by requiring voiceprint recognition capability through VCS 16 in addition to presenting a correct alphanumeric access code as already described, the user's spoken voice may be included as a component of permitting or delimiting access. Voiceprint recognition may run as an additional pre-admission step. Alternatively, ongoing voiceprint recognition may run in the background after the initial access is permitted through alphanumeric code input and an initial voiceprint check.

Figure 7:
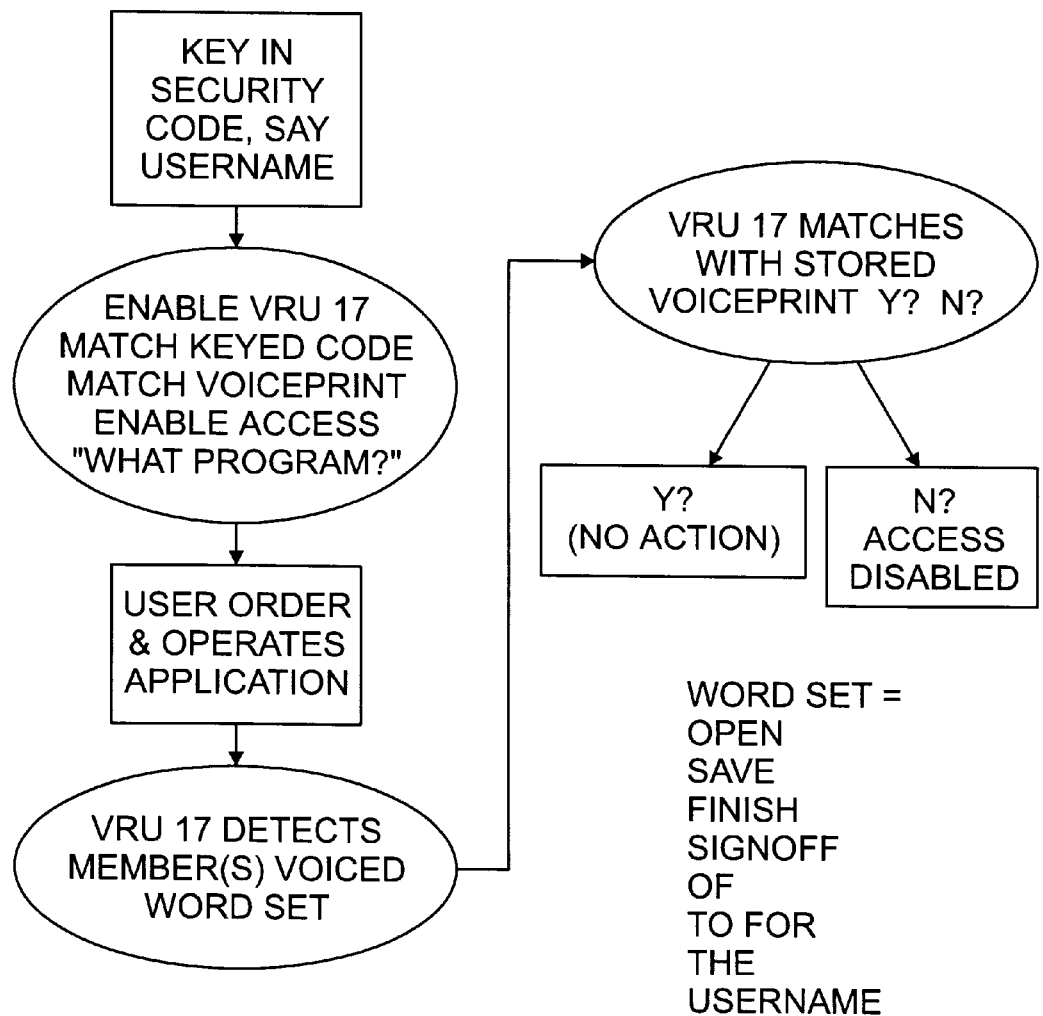
FIG. 7 is a flowchart illustrating use of both keyed access code and voiceprint recognition to provide security.

FIG. 7 illustrates use of voiceprint recognition to provide further security check. In addition to the usual security code voice entry such as of his/her name, the user pre-enters a set of voiced entries into VRU 17 of words that are usually voiced by that same user in using the invention during remote accessing, such as, for example: "OPEN", "SAVE", "FINISH", "SIGN-OFF", etc. Further, the user pre-enters several common words found in most letter or electronic mail documents, including "OF" "TO", "FOR", "THE"; and numbers such as "ONE", "TWO", "THREE"; and other usually-employed words as may be found through experience.

After numerical code access is granted, VRU 17 is activated and receives the user's voiced name. If a match is made to the user's stored name voiceprint, controller 15 connects the call to DPS 1; if not, the connection is not made. The additional voice recognition routines are initiated, for example, as soon as name voiceprint access is granted by controller 15. Then, as user proceeds with remote operation, VRU 17 looks for the presence of the above-noted words in the user's speech train. When such a word is identified, the word is flagged and a match routine with the corresponding stored voiceprint is run in VRU 17. If a match is found, controller 15 retains the computer connection; if not, VCS 16 suspends the session and requests the user to provide confirming identification; or, alternatively, the connection is severed. Severing of the connection is illustrated in FIGS. 3 and 4, by a reference to the steps of FIG. 7. The connection and disconnection may be effected by, for example, ALU 23.

As another security precaution, controller 15 may be set so as not to initiate downloading or sending/distributing of any files unless and until VRU 17 has verified voiceprint recognition by matches with at least a prescribed minimum of the additional words of the user which are stored for recognition purposes.

I claim:

1. A process for enabling a remote user to operate application programs in a personal computer from a remote telecommunications terminal having a tone keypad through a connecting communications network without benefit of any user interaction with a screen display for controlling said application programs, said personal computer comprising:

a processor; an internal memory; a machine-readable medium; one or more application programs contained in said memory; a voice command system comprising:

a voice recognition unit;

a voice/text converter comprising: software for converting voice commands to corresponding application program-specific commands and for converting coded text to voice; and a controller connecting said personal computer and said voice command system to a network and comprising software for translating tone signals to application program-specific commands, said process comprising the steps of:

transmitting user-entered tone and voiced signals from said terminal to said controller, said tone and voiced signals corresponding to application-specific commands including commands to load a selected application program from said memory to said machine-readable medium;

receiving in said controller said tone and voiced signals and converting said signals in said converter to said corresponding application-specific commands; said signals including commands to forward a file in said computer to selected destinations including a printer, a copier, a fax machine or an email address;

executing said commands in said processor under control of said controller to perform application program functions;

prompting said user with voiced queries contained in said voice command system to issue sequenced commands, and with voiced announcements of completed command executions; and interrupting said sequenced commands from said voice command system with one or more unsequenced user-selected voice commands issued from said remote terminal to invoke new application program functions.

2. A process in accordance with claim 1, wherein said application program is a word processor; and said process comprises the further steps of:

designating from said remote telecommunications terminal by user-entered voice or tone identifier a first voiced text element, and transmitting said identifier with said text element to said voice command system;

receiving and storing in said voice-text file converter of said voice command system said first text element and the associated said unique identifier;

modifying said first text element by transmitting from said remote telecommunications terminal said identifier followed by a substitute text element; and using said identifier, replacing in said voice-text file converter said first text element with said substitute text element.

3. A process in accordance with claim 2, wherein said sequence of voiced prompts and user responses further comprises:

transmitting to said voice command system a user-generated voice or tone command for ordering read-back of designated voice text; and receiving in said voice command system said read-back command, and in response transmitting back to said user said designated voice text.

4. A process in accordance with claim 1, wherein said application program is a spreadsheet; and wherein said step of generating a sequence of voiced prompts and user responses further comprises:

designating by user-entered voice or tone command a given cell in said spreadsheet; and transmitting to said voice-text file converter by user-entered voice command an entry or a modification of a numeric, label, or formula value for said designated cell.

5. A process in accordance with claim 4, wherein said generating of a sequence of voiced prompts and user responses comprises the further step of:

commanding by user-entered voice or tone instructions a read-back of numeric, label or formula values entered in a designated said cell.

6. A process in accordance with claim 3 or claim 5, wherein said controller further comprises an access-limiting unit for receiving an access code from said remote user and for connecting said user to said computer upon verifying that said access code is valid; said access-limiting unit further comprising an access table locally programmable to restrict remote use of specified application program functionalities;

and said process comprises said user taking the further steps of:

issuing said access code from said remote terminal to enable said personal computer; and setting permitted and prohibited program functionalities into said access table by remotely-generated commands.

7. A process in accordance with claim 6, wherein said voice recognition unit further comprises:

a word store containing a plurality of selected pre-recorded word voiceprints entered by said user, said selected words comprising voiced commands and prompt responses employed by a user in remotely running said selected application program;

and wherein said process comprises the further steps of:

monitoring continuing voiced transmissions of said remote user, flagging uses of said pre-recorded words; and comparing each said flagged word with its corresponding word voiceprint to determine the degree of match.

8. A personal computer comprising a processor, an internal memory, a machine-readable medium, one or more application programs contained in said internal memory for loading into said machine-readable medium, a modem for connecting said personal computer to an external network, and apparatus for enabling, through a combination of tone signals and voice commands, operation by a user of said one or more application programs from a remote telephone set connected to said network without benefit of any user interaction with a screen display for controlling said application programs, said apparatus comprising:

a voice command system comprising:

a memory containing application program-specific voiced prompts; and means for translating incoming voice signals to corresponding application program-specific commands;

a voice/text converter comprising means for translating text files to voiced words;

means for generating a first voiced prompt requesting said user to select an application program for opening;

means for generating a sequence of further voiced prompts to said user enabling said user to respond to each said prompt in sequence by voice or by tone signal with selected commands to run said opened application program; and means for responding to any said application program-specific command made by said user out-of-sequence.

9. A personal computer in accordance with claim 8, further comprising a controller connecting said voice command system and said personal computer to said network, said controller comprising:

means responsive to dial-up of said modem by a remote user for turning said computer on;

an access-limiting unit for receiving an access code from said remote user and for connecting said user to said computer upon verifying that said access code is valid;

means for translating tone signals entered by said user through said telephone set into their corresponding application program-specific commands;

means for transmitting said application program-specific commands to said computer for execution; and means responsive to tone or voice commands for forwarding a file in said computer to selected destinations including a printer, a copier, a fax machine or an email address.

10. A personal computer in accordance with claim 9, wherein said application program is a word processor; and wherein said voice command system further comprises:

means for associating a voice or tone signal with individual text elements entered by user voice, to uniquely identify each said element; and means for receiving further text elements entered by voice accompanied by said unique identifier, and for substituting said further text elements for the previously-transmitted said text elements having the same said unique identifier.

11. A personal computer in accordance with claim 10, wherein said sequence of voiced prompts in said voice command system includes prompts enabling said user to command a voice read-back of text earlier entered in voice by said remote user.

12. A personal computer in accordance with claim 9, wherein said application program is a spreadsheet; and said voice command system further comprises:

voice prompts and user responses for pointing to any cell in said spreadsheet; and means responsive to voiced commands from said remote user for entering or modifying the contents of a said pointed cell.

13. A personal computer in accordance with claim 12, wherein said voice command system further comprises: voiced prompts and user responses for commanding read-back of labels, numeric values or formulae content entered in a said pointed cell.

14. A personal computer in accordance with claim 11 or claim 13, wherein said access-limiting unit further comprises:

means for storing preset permissions for designated users to use said application programs; and an access table for containing restriction settings which block remote use of specified application program functionalities; and means for allowing a designated user to re-set said restriction settings by voice command issued from a remote location.

15. A personal computer in accordance with claim 14, wherein said voice command system further comprises:

a word store containing space for storing a plurality of selected pre-recorded word voiceprints to be created by a specific said user, said selected words comprising voiced commands and prompt responses frequently used in remotely running said selected application program;

means for monitoring continuing voiced transmissions of said remote user and for flagging uses of any said pre-recorded words in said word store;

means for comparing each said flagged word with its corresponding word voiceprint; and means for suspending or terminating connection to said remote user if said comparing means detects an insufficient match.

16. A non-volatile storage medium containing computer software encoded in a machine-readable format for enabling a user to remotely control from a telephone set over a telecommunications network application programs in a personal computer without benefit of any user interaction with a screen display for controlling said application programs, said personal computer comprising:

a processor;

application programs stored in an internal memory of said personal computer, a voice command system; and a controller connecting said personal computer to said network through a modem and having an access-limiting unit, said computer software comprising:

a set of computer instructions executed in said voice command system for generating a first voiced prompt requesting said user to select an application program to be opened, and thereafter for generating a predetermined sequence of voiced prompts guiding said user to issue by voice or by tone signals a pre-set sequence of commands to run application program functions;

a set of computer instructions for receiving said voiced and tone signals and for converting said signals to corresponding application program-specific commands;

a set of computer instructions for transmitting said application program-specific commands to said processor to perform application program functions;

a set of computer instructions for informing said user with voiced announcements of completed command executions;

a set of computer instructions responsive to tone or voice commands to forward a file in said computer to pre-selected destinations; and a set of computer instructions executed in said voice command system for overriding execution of said pre-set sequence of commands, upon receipt from said user of one or more user-selected voice commands which invoke out-of-sequence application program functions.

17. A non-volatile storage medium in accordance with claim 1, wherein said application program is a word processor, and said medium further comprises:

a set of computer instructions enabling said remote user to enter in said word processor voiced text elements and an associated voice or tone signal that uniquely identifies each said text element; and a set of computer instructions for using said unique text element identifier to designate voiced text intended by said user to replace said text element.

18. A non-volatile storage medium in accordance with claim 17, further comprising:

a set of computer instructions responsive to a voiced remote user command for reading back in voice mode text entered by voice.

19. A non-volatile storage medium in accordance with claim 16, wherein said application program is a spreadsheet comprising a plurality of cells; and wherein said storage medium further comprises:

a set of computer instructions responsive to voice signals for pointing to any said cell in said spreadsheet; and a set of computer instructions responsive to voiced commands from said remote user for entering or modifying a numeric value, formulaic statement or label in a said pointed cell.

20. A non-volatile storage medium in accordance with claim 19, further comprising:

a set of computer instructions responsive to voiced commands from said remote user for generating voice read-back of labels, numeric values or formulae entered in a said pointed cell.

21. A non-volatile storage medium in accordance with claim 16, further comprising:

a set of computer instructions responsive to dial-up of said modem by a remote user for activating said access-limiting unit;

a set of computer instructions for receiving an access code from said remote user and for connecting said user to said computer upon verifying that said access code is valid;

a set of computer instructions for creating an access table in said access-limiting unit, said access table governing access to said personal computer on which said non-volatile storage medium is used; and a set of computer instructions enabling a user to enter restriction settings into said table which block remote use of user-selected application program functions.

22. A non-volatile storage medium in accordance with claim 16 or claim 21, further comprising:

a word store containing space for storing a plurality of selected pre-recorded word voiceprints of said user, said selected words comprising voiced commands and prompt responses used most frequently in remotely running said selected application program;

a set of computer instructions for monitoring continuing voiced transmissions of said remote user and for flagging uses of any said words for which corresponding voiceprints are pre-recorded in said word store;

a set of computer instructions for making voiceprints of said flagged words and for comparing each said flagged word voiceprint with the corresponding word voiceprint in said word store; and a set of computer instructions for suspending or terminating said remote usage of a running application program if said comparing step detects an insufficient match.

* * * * *